United States Patent
Koizumi et al.

(10) Patent No.: US 10,454,123 B2
(45) Date of Patent: Oct. 22, 2019

(54) METAL-SUPPORTED CELL

(71) Applicant: HONDA MOTOR CO., LTD., Tokyo (JP)

(72) Inventors: Atsushi Koizumi, Wako (JP); Hironobu Akutagawa, Suita (JP); Yohei Nishikawa, Himeji (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/742,995

(22) PCT Filed: Aug. 2, 2016

(86) PCT No.: PCT/JP2016/072661
§ 371 (c)(1),
(2) Date: Jan. 9, 2018

(87) PCT Pub. No.: WO2017/022762
PCT Pub. Date: Feb. 9, 2017

(65) Prior Publication Data
US 2019/0088969 A1 Mar. 21, 2019

(30) Foreign Application Priority Data
Aug. 3, 2015 (JP) ................................. 2015-153615

(51) Int. Cl.
*H01M 8/1226* (2016.01)
*H01M 4/88* (2006.01)
(Continued)

(52) U.S. Cl.
CPC ....... *H01M 8/1226* (2013.01); *H01M 4/9025* (2013.01); *H01M 8/0232* (2013.01);
(Continued)

(58) Field of Classification Search
None
See application file for complete search history.

(56) References Cited

U.S. PATENT DOCUMENTS

2003/0207166 A1 11/2003 Hara et al.
2015/0064597 A1 3/2015 Leah et al.
(Continued)

FOREIGN PATENT DOCUMENTS

JP 2003-051321 * 2/2003 ............. H01M 8/02
JP 2003-51321 A 2/2003
(Continued)

OTHER PUBLICATIONS

Faes et al., "A review of RedOx Cycling of Solid Oxide Fuel cells Anode," Membranes 2012, 2, 585-664 (Year: 2012).*
(Continued)

*Primary Examiner* — Amanda J Barrow
(74) *Attorney, Agent, or Firm* — Westerman, Hattori, Daniels & Adrian, LLP

(57) ABSTRACT

A metal-supported cell comprises a laminate wherein a fuel electrode layer and a solid electrolyte layer are sequentially arranged in this order on a front surface of a metal support provided with a pore continuing from the front surface to the back surface. The solid electrolyte layer covers all parts of the surface of the fuel electrode layer, the parts being not in contact with the metal support. The peripheral part of the solid electrolyte layer is in contact with the front surface of the metal support. The metal support has a metal oxide layer. The fuel electrode layer contains NiO and Ni with molar ratio NiO/(Ni+NiO) of 45% or more, while containing gadolinium-doped ceria. The solid electrolyte layer mainly contains scandia-stabilized zirconia, while containing 0.1-10.0 mol of Bi atoms per 100 mol of Zr atoms having cross-sectional void fraction of 5.0% or less.

11 Claims, 1 Drawing Sheet

(51) Int. Cl.
*H01M 4/90* (2006.01)
*H01M 8/1253* (2016.01)
*H01M 8/124* (2016.01)
*H01M 8/126* (2016.01)
*H01M 8/0232* (2016.01)

(52) U.S. Cl.
CPC ......... *H01M 8/126* (2013.01); *H01M 8/1253* (2013.01); *H01M 4/8885* (2013.01); *H01M 2008/1293* (2013.01); *Y02E 60/525* (2013.01); *Y02P 70/56* (2015.11)

(56) References Cited

U.S. PATENT DOCUMENTS

2017/0309941 A1* 10/2017 Echigo .................... H01M 8/12
2018/0205105 A1* 7/2018 Takeuchi ............ H01M 4/8668
2019/0006680 A1* 1/2019 Mizuhara ................ H01M 8/12

FOREIGN PATENT DOCUMENTS

| JP | 2003-277058 A | 10/2003 |
| JP | 2003-323901 A | 11/2003 |
| JP | 3940946 B2 | 7/2007 |
| JP | 2007-323957 A | 12/2007 |
| JP | 2013-201038 A | 10/2013 |
| WO | 2015/033104 A1 | 3/2015 |
| WO | 2016/043328 A1 | 3/2016 |

OTHER PUBLICATIONS

International Search Report dated Oct. 25, 2016, issued in counterpart International Application No. PCT/JP2016/072661 (2 pages).

* cited by examiner

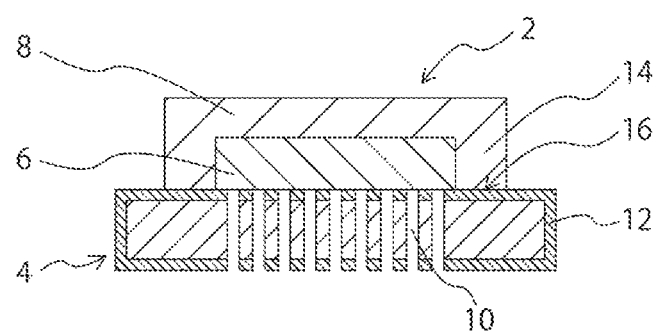

METAL-SUPPORTED CELL

FIELD

The present invention relates to metal-supported cells.

BACKGROUND

Recently, metal-supported cells have been developed actively (for example, see Patent Literature 1). The metal-supported cells exhibit excellent properties such as higher mechanical strength, more rapidly starting up, and higher resistance to re-dox characteristics than conventional electrolyte-supported cells or electrode-supported cells. Stabilized zirconia by the addition of rare earth atoms or the like have been used as solid electrolytes contained in the metal-supported cells. Conventionally, the solid electrolytes of the stabilized zirconia by the addition of rare earth atoms or the like needed to be sintered at a high temperature. Therefore, in production of the metal-supported cells, when the solid electrolyte layers and the metal supports are sintered together at the high temperature, it's sometimes bound to cause problems of metal support deterioration and peeling between the solid electrolyte layers and the metal supports.

$Bi_2O_3$ has been known as a sintering agent in forming of the solid electrolytes containing the stabilized zirconia by the addition of rare earth atoms or the like. Patent Literature 2 describes solid-state zirconia materials containing $Sc_2O_3$, $Bi_2O_3$ and $CeO_2$ as solutes, and the content of $Bi_2O_3$ and $CeO_2$ being 0.5-5 mol % in total. Further, Patent Literature 3 describes solid electrolyte materials having the composition formula of x mol % $Sc_2O_3$–y mol % $Bi_2O_3$–(100–x–y) mol % $ZrO_2$ (5≤x≤15, 0.5≤y≤3, x+y≥8). The solid electrolyte materials are used as a raw powder of raw materials for solid electrolytes. In the raw powder, $Bi_2O_3$ dissolves in $ZrO_2$, and 5-15 mol % of $Sc_2O_3$ also dissolves in $ZrO_2$ to form a solid solution. The materials are prepared by the coprecipitation process, and sintered at 970-1500° C. to form the solid electrolyte.

In metal-supported cells preparation, it has been required that the metal-supported cells can be well sintered at lower temperature such as 1200° C. or less in condition of layered on metal supports, and that the sintered metal-supported cells have a high ion-conductivity, a high adhesion between the metal supports and solid electrolyte layers to suppress an interfacial peeling between them, and stable cell characteristics.

CITATION LIST

Patent Literature

[Patent Literature 1] Japanese Unexamined Patent Application Publication No. 2013-201038
[Patent Literature 2] Japanese Unexamined Patent Application Publication No. 2003-277058
[Patent Literature 3] Japanese Unexamined Patent Application Publication No. 2003-51321

SUMMARY

Technical Problem

The object of the present invention is to provide metal-supported cells each having a high ion-conductivity, a high adhesion between a solid electrolyte layer and a metal support to suppress an interfacial peeling between them, and stable cell characteristics.

Solution to Problem

The inventors found that a metal-supported cell, containing a specific solid electrolyte layer layered on a surface of a specific fuel electrode layer, and containing a metal support which surface is treated by a specific materials, has a high ion-conductivity and a high adhesion between the solid electrolyte layer and the metal support to suppress the interfacial peeling between them. Further, the present metal-supported cell has stable cell characteristics, and thus the inventors had completed the invention.

In the present invention, a metal-supported cell has a laminate comprising a metal support, a fuel electrode layer, and a solid electrolyte layer. The metal support is provided with a pore continuing from a front surface of the metal support to a back surface of the metal support. The fuel electrode layer and the solid electrolyte layer are arranged in this order on the front surface of the metal support. The solid electrolyte layer covers all parts of a surface of the fuel electrode layer, the parts being not in contact with the metal support. A peripheral part of the solid electrolyte layer is in contact with the front surface of the metal support. The metal support contains a metal oxide layer having a thickness of 1-5 μm on the front surface of the metal support. The fuel electrode layer contains a conductive component and an ion-conductive component. The conductive component includes NiO and Ni, and a molar ratio of NiO/(Ni+NiO) is 45% or more. The ion-conductive component is gadolinium doped ceria. The solid electrolyte layer mainly contains a scandia-stabilized zirconia, contains Bi in an amount of 0.1-10.0 mol in terms of atom content relative to 100 mol of Zr atoms, and has a porosity of 5.0% or less as observed in a cross-section of the electrolyte layer on a scanning electron microscope.

Advantageous Effects of Invention

In the present invention, the metal-supported cell contains a specific solid electrolyte layer layered on a surface of a specific fuel electrode layer, and contains a metal support which surface is treated by a specific materials. Therefore, the metal-supported cell has a high ion-conductivity, a high adhesion between the solid electrolyte layer and the metal support, and has stable cell characteristics. The high adhesion between the solid electrolyte layer and the metal support suppresses an interfacial peeling between them.

BRIEF DESCRIPTION OF DRAWINGS

FIG. 1 is a schematic cross-sectional view of an embodiment of a metal-supported cell in the invention.

DESCRIPTION OF EMBODIMENTS

In the following description, the expression of "A–B" indicating a range means "A or more and B or less", if it does not have any specific notice.

1. Metal-Supported Cell

The metal-supported cell of the present invention (hereinafter sometimes called simply "cell") includes a laminate having a fuel electrode layer, a solid electrolyte layer, and a metal support. The fuel electrode layer and the solid electrolyte layer are arranged in this order on a front surface of the metal support. The metal support has a pore continuing from the front surface to a back surface of the metal support. The solid electrolyte layer covers all parts of a surface of the fuel electrode layer, the parts being not in contact with the metal support. A peripheral part of the solid electrolyte layer is in contact with the front surface of the metal support. In the metal-supported cell of the present invention, as mentioned below, the cell has a high adhesion between the solid electrolyte layer and the metal support to suppress the interfacial peeling between them. Therefore, in the metal-supported cell of the present invention, the leak of fuel gas can be protected in a simple way with the above-mentioned solid electrolyte layer arrangement, and the cell can have stable cell characteristics.

In FIG. 1, it is shown a schematic cross-sectional view of a metal-supported cell 2 in an embodiment of the invention. Reference No. 4 indicates a metal support. The metal support 4 has pores 10 continuing from a front surface to a back surface of the metal support 4. The metal support 4 contains a metal oxide layer 12 having 1-5 μm of thickness on its surface. The metal oxide layer 12 may be formed on not only all surface of the metal support 4 but also partial surface of the metal support 4. Preferably, the metal oxide layer 12 is formed on the surface on which a fuel electrode layer 6 or a solid electrolyte layer 8 mentioned below will be formed.

The fuel electrode layer 6 is layered on the surface of the metal support 4. The solid electrolyte layer 8 is arranged on the fuel electrode layer 6. Reference No. 14 indicates a peripheral part of the solid electrolyte layer 8. A contact portion 16 is in the solid electrolyte layer 8 and is in contact with the metal support 4. The peripheral part 14 of the solid electrolyte layer 8 is in contact with the metal support 4 through the contact portion 16. A width of the contact portion 16, in the solid electrolyte layer 8 and in contact with the metal support 4, is preferably 1 mm or more, more preferably 2-5 mm. When the width is less than 1 mm, portions around the fuel electrode layer may not be sealed sufficiently and may cross-leak in some cases. When the width is more than 5 mm, the metal support needs a large area in comparison with the fuel electrode, and then, the output density per unit area of cells may reduce.

1-1 Metal Support

In the present invention, the metal support contained in the metal-supported cell is particularly not limited as long as it contains metal material and has a pore continuing from a front surface to a back surface of the metal support. The metal material is particularly not limited, and Fe, Ti, Cr, Cu, Ni, Ag or the like can be used. The metal material can be used as single metal or used in the form of alloy of 2 kinds or more of metal. The material of the alloy of 2 kinds or more of metal is particularly not limited, and nickel based high-temperature resistant alloy, nickel-chromium alloy, iron-chromium alloy, austenitic stainless steel (ex. SUS304), and ferritic stainless steel (ex. SUS430) or the like can be used. Among them, ferritic stainless steel is preferable because it has broad utility and is inexpensive material.

The metal support, as mentioned above, has the continuous pore continuing from the surface, on which the fuel electrode layer is arranged, to the opposite side surface. The structure having the continuous pore is particularly not limited, and for example, the following material can be preferably used: porous bodies made by forming and sintering many metal pieces regularly or irregularly; and dense metal plates having through-holes formed by an etching process or by a mechanical process such as a laser-punching process. The examples of them are a wire net sintered body (which is also called sintered wire cloth), a metal powder sintered body (which is also called sintered metal), a metal fiber sintered body (which is also called sintered nonwoven fabric), and a chopped metal fiber powder sintered body. The metal support can have one continuous pore or more, and more than one continuous pores are preferable. The spatial shape of the continuous pores is not limited, and can be a regular shape or an irregular shape. Further, the through-holes mean the continuous pores which penetrate approximately linearly from one surface of the metal support to the other surface of the metal support.

The pore size of the continuous pores which are formed in the above-mentioned metal support is not limited, but an effective pore size "dy" is preferably 0.05-1000 μm, more preferably 0.1-500 μm, and the most preferably 0.2-200 μm. The effective pore size "dy" is determined with a method of measuring the pore size of a filter by measuring the diameter of particles passed through the filter when the particles are filtering (JIS-B8356-8). The effective pore size "dy" is a value of the particle diameter when the filter captures 95% of the particles.

The metal support has the metal oxide layer of 1-5 μm thickness on its front surface. When the thickness of the metal oxide layer is less than 1 μm, the adhesion of the support to the fuel electrode layer or the solid electrolyte layer may reduce, and thinly thickness area of the metal oxide layer may be generated to suppress homogeneous adhesion. When the thickness of the metal oxide layer is more than 5 μm, the electro-conductivity between the fuel electrode layer and the metal part of the support may reduce because the resistivity of the metal oxide layer part may increase, and the peeling between the support and the metal oxide layer may arise. With having the 1-5 μm thickness of the metal oxide layer, the adhesion between the solid electrolyte layer and the metal support improves, and the interfacial peeling between the solid electrolyte layer and the metal support is suppressed.

Further, in the operation of the cell of the present invention, there is a risk that the material of the metal support will be changed or deteriorated because of the exposure to reducing atmosphere (fuel gas) or oxidizing atmosphere (air). Preferably, by using the metal support which is covered with the metal oxide layer of 1-5 μm thickness, the deterioration of the material of the metal support can be suppressed while securing the conduction in the surface of the metal support. The metal oxide layer of 1-5 μm thickness is preferably formed on the area where the fuel electrode layer and the solid electrolyte layer will be formed, and the metal oxide layer is more preferably formed on the whole area where the fuel electrode layer and the solid electrolyte layer will be formed.

The metal oxide used as the metal oxide layer is preferably a substance which can suppress the deterioration of the material of the metal support. Examples of the metal oxide include: spinel based metal oxide such as $NiCo_2O_4$, $(Zn_xCo_{1-x})Co_2O_4$ (0.45≤x≤1.00), $FeMn_2O_4$, $NiMn_2O_4$, $CoMn_2O_4$, $MnFe_2O_4$, $MnNi_2O_4$, $MnCo_2O_4$, $Mn(Mn_{0.25}Co_{0.75})_2O_4$, $(Mn_{0.5}Co_{0.5})Co_2O_4$, $Mn_{1.0}Co_{1.9}Fe_{0.1}O_4$, $TiCo_2O_4$, $ZnFe_2O_4$, $FeCo_2O_4$, $CoFe_2O_4$, $MgCo_2O_4$, $Co_3O_4$; chromium oxide; and the like. The method of forming the metal oxide layer can be a method of coating the surface of the metal support with chromium oxide layer by oxidizing Cr contained in the metal support, for example. The thickness of the metal oxide layer is 1-5 μm as observed in its cross-section on a scanning electron microscope

1-2 Fuel Electrode Layer

The fuel electrode layer which is involved in the cell of the invention contains the conductive component and the ion-conductive component. The conductive component contains NiO and Ni. The molar ratio of NiO/(Ni+NiO) is 45% or more. The molar ratio of NiO/(Ni+NiO) is preferably 45-80 mol %. By remaining more NiO in the fuel electrode layer, the relatively dense fuel electrode layer can be formed, and then, the dense solid electrolyte layer can be formed by using the solid electrolyte materials which can be sintered at lower temperature.

The molar ratio of NiO/(Ni+NiO) can be measured by composition analysis of the section observed on a scanning electron microscope made by JEOL Ltd.

In the fuel electrode layer, the ion-conductive component is gadolinium doped ceria. The gadolinium doped ceria preferably contains Gd in an amount of 5-30 mol in terms of atom content relative to 100 mol of cerium atoms.

Further, the fuel electrode layer is preferably a layer having pores in view of high fuel gas permeability.

A content of the electro-conductive component per 'total content of the electro-conductive component and the ion-conductive component' contained in the fuel electrode layer is preferably 30-80 mass %, and more preferably 40-70 mass %.

A thickness of the fuel electrode layer is preferably 5-50 µm, and more preferably 10-20 µm.

1-3 Solid Electrolyte Layer

The solid electrolyte layer arranged in the metal-supported cell of the present invention mainly contains scandia-stabilized zirconia and contains bismuth in an amount of 0.1-10.0 mol in terms of atom content relative to 100 mol of zirconium atoms. The solid electrolyte layer has a porosity of 5.0% or less as observed in a cross-section of the solid electrolyte layer on a scanning electron microscope. In the present specification, "mainly containing scandia-stabilized zirconia" means that a content of scandia-stabilized zirconia is, for example, 50 mass % or more, and preferably 60 mass % or more.

The solid electrolyte layer can contain other known stabilized zirconia. Examples of the other stabilized zirconia include stabilized zirconia by the addition of one kind or two kinds or more of: alkaline earth metal oxide such as MgO, CaO, SrO and BaO; a rare earth oxide such as $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$ and $Yb_2O_3$; and other metal oxide such as $In_2O_3$.

The stabilized zirconia is preferably (partially) stabilized zirconia having tetragonal crystal structure or cubic crystal structure. The solid electrolyte layer can further contain a metal oxide such as $Al_2O_3$, $TiO_2$, $Ta_2O_3$ and $Nb_2O_5$. The metallic element forming the metal oxide can dissolve at least in part in the stabilized zirconia to form a solid solution.

The solid electrolyte layer contains bismuth in an amount of 0.1-10.0 mol in terms of atom content relative to 100 mol of zirconium atoms. The content of bismuth atoms is preferably 2 mol or more, and more preferably 4 mol or more per 100 mol of zirconium atoms.

1-3-1 Porosity

The solid electrolyte layer has a porosity as observed in a cross-section of the solid electrolyte layer on a scanning electron microscope (hereinafter sometimes called simply "porosity") of 5.0% or less, preferably 2.0% or less. A lower limit of the porosity is preferably 0%. In the present invention, the porosity means the area rate of pore area in the cross-section. When the porosity is within the above-mentioned range, gas cross leaks between the electrodes can be cut off, and then a cell having high generation performance and excellent in safety can be produced.

Specifically, the porosity can be calculated, for example, by the following method. In the method, a sample for observation in a cross-section of the solid electrolyte layer is prepared by polishing the cutting surface of the solid electrolyte layer with ion milling. Next, images of any 5 points, preferably or more, at arbitrary suitable positions in the cutting surface of the solid electrolyte layer are recorded on a scanning electron microscope (for example, 10,000 magnifications). Then, binary images of pore area and non-pore area are created by imbinarizing from the images to calculate the area of pores and the area of non-pores respectively, and to obtain a porosity as an average rate of the area of pores in the whole area obtained from the images.

1-3-2 Grain Size

The solid electrolyte layer preferably has an average grain size of 1.0 µm or more (for example, 1.0-10 µm) as observed on a FE-SEM. The average grain size is more preferably 1.0-5.0 µm, further preferably 1.2-5.0 µm. When the grain size is within the above-mentioned range, the layer densified and well sintered can be obtained.

The average of grain size can be calculated with the following calculation method.

<Calculation Method of Grain Size>

1. The area of a grain is calculated from FE-SEM images with an image analyzing soft to obtain each of the areas for predetermined number of grains.
2. An average of the areas obtained in 1. is calculated.
3. Grain size is obtained as the diameter back calculated with a formula of a circle area on the assumption that the each shape of the grains is a circle.

1-3-3 Thickness

The thickness of the solid electrolyte layer is preferably 1-50 µm, more preferably 1-25 µm, further preferably 1-20 µm. By reducing the thickness, oxygen ion-conductivity becomes higher, and electricity generation performance can be improved.

1-4 Air Electrode Layer

In the present invention, an air electrode layer can be formed on the solid electrolyte layer in the laminate included in the metal-supported cell. The air electrode layer is particularly not limited as long as the air electrode layer contains metal oxide having catalytic activity for cathode when the cell for a solid oxide fuel cell is generating electricity. Examples of the metal oxide having catalytic activity for cathode include: composite oxide containing at least one kind of metal such as La, Pr, Sm, Sr, Ba, Co, Fe and Mn or the like, and for example, lanthanum-manganite, lanthanum-ferrite, lanthanum-cobalt-ferrite and lanthanum-cobaltite, in which strontium dissolves to form a solid solution. More preferably, the air electrode layer is a layer further containing at least one kind or more of metal oxide including: oxygen ion-conductive metal oxide such as stabilized zirconia, doped ceria, stabilized bismuth and lanthanum gallate; and oxygen ion-electron mixed conductive metal oxide.

1-5 Another Layer

In the present invention, the metal-supported cell can have, for example, another layer in addition with the fuel electrode layer, the solid electrolyte layer and the air electrode layer. As the above-mentioned another layer, for example, a barrier layer (for example, a layer of samarium doped ceria or gadolinium doped ceria) is exemplified. The barrier layer prevents the cell from a performance reduction induced by generation of a high-resistivity material layer formed by reacting the solid electrolyte layer with the air electrode layer.

2. Method of Producing Metal-Supported Cell

Preferably, in the present invention, the method of producing the metal-supported cell, including the laminate having the fuel electrode layer, the solid electrolyte layer, and the metal support having the pore continuing from the front surface to the back surface of the metal support, comprises:

a step for forming the metal oxide layer having 1-5 μm thickness on the front surface of the metal support;

a step for forming the fuel electrode layer, containing the ion-conductive component of gadolinium doped ceria, and containing the electro-conductive component of nickel oxide (NiO) and nickel (Ni); and a step for forming the solid electrolyte layer mainly containing scandia-stabilized zirconia, and containing Bi in an amount of 0.1-10.0 mol in terms of atom content relative to 100 mol of Zr atoms.

In the fuel electrode layer, the molar ratio of NiO/(Ni+NiO) is 45% or more. The solid electrolyte layer covers all parts of the surface of the fuel electrode layer, the parts being not in contact with the metal support. The peripheral part of the solid electrolyte layer is in contact with the front surface of the metal support. The solid electrolyte layer has the porosity of 5.0% or less as observed in a cross-section of the solid electrolyte layer on a scanning electron microscope.

In the metal-supported cell of the present invention, a method of arranging layers on the metal support is described below. The layers include: the fuel electrode layer; the solid electrolyte layer; and layers, which are preferably included, such as the air electrode layer and the above-mentioned another layer.

2-1 Preparation of Metal Support (Step for Forming Metal Oxide Layer)

The metal support having the metal oxide layer of 1-5 μm thickness is prepared. The specific preparing method is exemplified below.

As a method of forming the metal oxide layer, a conventionally known method of forming metal oxide layers can be used. Examples of the conventionally known method of forming metal oxide layers include vacuum deposition, ion plating, spattering, CVD, thermal spraying, plating and sol-gel method. Further, as a method of forming a chromium oxide layer, a method with heat treatment as mentioned below can be used.

The metal support having a chromium oxide layer of 1-5 μm thickness can be produced by heat treating a metal support containing Cr at 600-800° C. under an oxidizing atmosphere. Examples of the metal support containing Cr include austenitic stainless steel such as 18Cr-8Ni, 18Cr-12Ni-2Mo and 25Cr-20Ni; and ferrite stainless steel such as 18Cr, 19Cr-2Mo—Ti/Nb/Zr and 22Cr. Among them, 22Cr of ferrite stainless steel is preferably used.

The treatment can be treated at any atmosphere as long as the atmosphere is an oxidizing atmosphere, and a gas containing 20 vol % or more oxygen is preferable. Time of the heat treatment at 600-800° C. is preferably 1-24 hours.

The metal support having a spinel based metal oxide layer of 1-5 μm thickness can be produced by forming a spinel based metal oxide layer with dry process and wet process on the surface of the metal support made of: austenitic stainless steel such as 18Cr-8Ni, 18Cr-12Ni-2Mo and 25Cr-20Ni; or ferrite stainless steel such as 18Cr, 19Cr-2Mo—Ti/Nb/Zr and 22Cr. Examples of the spinel based metal oxide layer include: $NiCo_2O_4$, $(Zn_xCo_{1-x})\ Co_2O_4$ ($0.45 \leq x \leq 1.00$), $FeMn_2O_4$, $NiMn_2O_4$, $CoMn_2O_4$, $MnFe_2O_4$, $MnNi_2O_4$, $MnCo_2O_4$, Mn $(Mn_{0.25}Co_{0.75})_2O_4$, $(Mn_{0.5}Co_{0.5})\ Co_2O_4$, $Mn_{1.0}Co_{1.9}Fe_{0.1}O_4$, $TiCo_2O_4$, $ZnFe_2O_4$, $FeCo_2O_4$, $CoFe_2O_4$, $MgCo_2O_4$ and $Co_3O_4$ type spinel layer. The spinel based metal oxide layer can be formed by a method such as vacuum deposition, ion plating, spattering, CVD, thermal spraying, plating and sol-gel method. Among them, forming $NiCo_2O_4$ by plating is preferable.

2-2 Formation of Fuel Electrode Layer (Step for Forming Fuel Electrode Layer)

The fuel electrode layer contains the electro-conductive component and the ion-conductive component. The electro-conductive component contains nickel oxide (NiO) and nickel (Ni) having a molar ratio of NiO/(Ni+NiO) being 45% or more. The ion-conductive component is gadolinium doped ceria (GDC).

Specifically, the metal oxide layer having 1-5 μm thickness is formed on the surface of the metal support, and NiO-GDC paste is printed by screen printing or the like on the surface of the metal oxide layer. The NiO-GDC paste is prepared by mixing a mixed powder of NiO powder and GDC powder with known binder and/or solvent (dispersion medium). The obtained mixture is mixed with dispersant, plasticizer and so on, as needed. The printed layer is dried, and the solvent (dispersion medium) is removed through volatilization. Further, the organic component such as the binder is removed by heating and debindering. Next, the fuel electrode layer together with the metal support is sintered at 800-1000° C. under a nitrogen atmosphere to make the fuel electrode layer having a molar ratio of NiO/(Ni+NiO) being 45% or more on the metal support.

2-3 Formation of Solid Electrolyte Layer on Fuel Electrode Layer (Step for Forming Solid Electrolyte Layer)

Formation of the solid electrolyte layer on the fuel electrode layer includes:

(1) a step for preparing a mixed powder by mixing a metal oxide powder mainly containing scandia-stabilized zirconia with a powder of compound containing bismuth;

(2) a step for forming a precursor layer of a mixed powder-containing layer by using the mixed powder on the fuel electrode layer; and (3) a step for sintering the mixed powder-containing layer.

Here, the meaning of "containing mainly scandia-stabilized zirconia" is the same as above. In the mixed powder preparing process, the content of bismuth atom in the mixed powder is 0.1-10.0 mol in terms of atom content relative to 100 mol of zirconium atoms.

2-3-1 Step for Preparing Mixed Powder

In the step for preparing a mixed powder, a powder of metal oxide mainly containing scandia-stabilized zirconia and a powder of compound containing bismuth is mixed to prepare the mixed powder.

Preferable embodiments of the powder of metal oxide mainly containing scandia-stabilized zirconia are the same as the preferable embodiments of the stabilized zirconia structuring the above mentioned solid electrolyte layer. The metal oxide such as $Al_2O_3$, $TiO_2$, $Ta_2O_3$, and $Nb_2O_5$ can be used, for example, as a dispersing enhancing agent.

A preparing method of the powder of metal oxide mainly containing scandia-stabilized zirconia is not particularly limited, and a known method such as a coprecipitation method can be used. Further, the powder obtained with the coprecipitation method can be calcined and ground under a known condition to prepare the powder of metal oxide mainly containing scandia-stabilized zirconia.

The compound containing bismuth is not particularly limited, and a compound such as bismuth oxide and bismuth nitric acid can be used. Especially, bismuth oxide is preferable. As mentioned above, the compound containing bismuth is mixed with the powder of metal oxide mainly containing scandia-stabilized zirconia in the amount of 0.1-10.0 mol of bismuth atoms, preferably 2 mol or more, more preferably 4 mol or more, in terms of atom content relative to 100 mol of zirconium atoms.

Preferably, in the solid electrolyte layer production, the powder of metal oxide mainly containing scandia-stabilized zirconia and the powder of the compound containing bismuth are mixed to be the mixed powder, and the mixed powder is sintered. The powder of the compound containing bismuth is preferably added in the form of the ground fine particle.

An average particle diameter (Dv50; median for a volume distribution) of the fine particle powder of the compound containing bismuth is, for example, preferably 1 µm or less, more preferably 0.5 µm or less, further preferably less than 0.25 µm, particularly preferably 0.2 µm or less. When the average particle diameter (Dv50) of the fine particle powder of the compound containing bismuth is within the above-mentioned range, the porosity of the solid electrolyte layer can be low more effectively. The average particle diameter (Dv50) of the mixed powder is preferably 0.05 µm or more, more preferably 0.1 µm or more.

The powder of the compound containing bismuth can be ground with the powder of metal oxide mainly containing scandia-stabilized zirconia as the mixed powder. In this case, an average particle diameter (Dv50) of the mixed powder is preferably 1 µm or less, more preferably 0.5 µm or less, further preferably less than 0.25 µm, particularly preferably 0.2 µm or less. When the average particle diameter (Dv50) of the mixed powder is within these range, the porosity of the solid electrolyte layer can be low more effectively. Further, the average particle diameter (Dv50) of mixed powder is preferably 0.05 µm or more, more preferably 0.1 µm or more.

The average particle diameter (Dv50) of the fine particle powder of the compound containing bismuth and the average particle diameter (Dv50) of the mixed powder can be obtained respectively from a particle size distribution based on the volume in a dispersion for measuring average particle diameter. The dispersion is prepared by adding the fine particle powder or the mixed powder into a suitable disperse medium such as 2-propyl alcohol to have a powder density of ca. 0.1 mass %, and the particle size distribution is measured with the dynamic light scattering method.

Examples of grinding methods include grinding with a mill such as a bead mill, a ball mill and a planetary mill using media such as zirconia beads and zirconia balls. Among them, the zirconia beads of about 0.1-1 mm diameter are used preferably.

2-3-2 Step for Forming Precursor Layer

In the step for forming a precursor layer, the layer containing the mixed powder is formed by using the mixed powder. The mixed powder can include a known binder and/or a solvent (dispersion medium). The mixed powder is mixed with a known binder and/or a solvent (dispersion medium), and further mixed with dispersant, plasticizer and so on as needed, to prepare a slurry. The fuel electrode layer, arranged on the metal support, is coated with the slurry by coating method such as blade coating and slit die coating, or by screen printing and so on to form a coating layer. Next, the coating layer is dried, and the dispersion medium is removed through volatilization to form a laminate.

The layer containing the mixed powder is produced so that the layer covers the whole surface of the fuel electrode layer and the peripheral part of the layer is in contact with the metal support. In an embodiment of the peripheral part of the layer being in contact with the metal support, the peripheral part can be formed at the same time as the forming of the layer covering the whole surface of the fuel electrode layer arranged on the metal support. In the embodiment, the layer containing the mixed powder can be formed by laminating with a coating method such as blade coating and slit die coating, screen printing and so on. And then, the layer is dried and dispersion medium is removed through volatilization from the layer. A contact width of the layer containing the mixed powder in the peripheral part in contact with the metal support is preferably 1 mm or more, more preferably about 2-5 mm.

A precursor layer of the air electrode layer can be arranged on the layer containing the mixed powder. In addition, it is preferable that the laminate formed as above can be provided with a precursor layer of the above-mentioned another layer. The precursor layer of the above-mentioned another layer can be preferably included at a suitable position in the laminate. Each of raw powders of the air electrode layer and the above-mentioned another layer is mixed with the known binder and/or a solvent (dispersion medium), and further mixed with dispersant, plasticizer and so on as needed, to prepare slurry respectively. The slurry is subjected to a coating treatment with a coating method such as blade coating and slit die coating, or with screen printing and so on to form the coating layers. The coating layers are dried, and the dispersion medium is removed through volatilization to form the precursor layer of the air electrode layer and the precursor layer of the above-mentioned another layer.

2-3-3 Step for Sintering

In the step for sintering, the precursor of the laminate which is formed as above is sintered. The precursor of the laminate includes the metal support, the layer containing the mixed powder, and the fuel electrode layer. The layer containing the mixed powder is arranged on the fuel electrode layer. Sintering temperature can be about 950-1300° C., preferably 950-1200° C. Since the layer containing the mixed powder can be sintered well at lower temperature, a solid electrolyte layer having low porosity of 5.0% or less can be produced by sintering at a temperature of 1200° C. or less. Further, a molar ratio of NiO/(Ni+NiO) in the fuel electrode layer is 45% or more, preferably 45-80% after sintering.

It seems that when the compound containing bismuth in the form of the fine particle powder is mixed with the powder of metal oxide mainly containing scandia-stabilized zirconia, properties inherent in the compound containing bismuth is kept and exhibited in contrast to a raw material powder mixed at an atomic level by using a coprecipitation method and so on. It seems that when bismuth oxide is used as the compound containing bismuth or when the compound containing bismuth changes to bismuth oxide while sintering, properties inherent in the compound containing bismuth such as a melting point is kept and exhibited. Since the melting point of bismuth oxide is lower than the sintering temperature, it is considered that, while sintering, bismuth oxide flows, diffuses and fuses, and grain growth and sintering of stabilized zirconia is promoted. Therefore, it is also considered that, in the stabilized zirconia in the present invention, grain growth is promoted and sintering performance is improved, and then, a solid electrolyte layer having low porosity of 5.0% or less can be produced.

Since the melting point of bismuth oxide is about 820° C., is not much far from the sintering temperature, and moderately low, it seems to be suitable for exhibition of solid-state dissolving performance. In contrast, when bismuth is dispersed at atomic level in the mixed raw powder by using coprecipitation method and so on, it seems that solid-state dissolving performance is difficult to be exhibited, and then, the grain growth of stabilized zirconia is not effectively promoted, the sintering performance is badly, and the porosity becomes higher.

Further, in the fuel electrode layer on which the precursor layer of the solid electrolyte layer is formed, by remaining much amount of NiO to have a molar ratio of NiO/(Ni+NiO) being 45% or more, a relatively dense fuel electrode layer can be formed. Therefore, when the solid electrolyte layer is formed with solid electrolyte material having high sintering performance at lower sintering temperature, the density of the solid electrolyte layer can be higher.

In the metal-supported cell of the present invention, the precursor of the laminate contains the metal support, the fuel electrode layer, the solid electrolyte layer, and the layers which can be preferably included in the laminate as the air electrode layer and the above-mentioned another layer. The precursor of the laminate can be sintered at a temperature of 1200° C. or less. In the metal-supported cell of the present invention, the porosity of the solid electrolyte layer can be controlled to be 5.0% or less by sintering at the temperature of 1200° C. or less. Therefore, according to the present invention, the metal-supported cell, having: the low porosity of the solid electrolyte layer; the high ion-conductivity; the excellent adhesion performance between the solid electrolyte layer and the metal support; controlled low interfacial peeling between the solid electrolyte layer and the metal support; and steady cell performance, can be obtained.

EXAMPLES

The present invention is described below specifically by using examples, however, the present invention is not limited in any way by the examples.

<Thickness Measurement of Metal Oxide Layer on Metal Support Surface>

The thickness of the metal oxide layer on the surface of the metal support was measured by cross-sectional observation on a scanning electron microscope manufactured by JEOL Ltd.

<Measurement of Ratio of NiO/(Ni+NiO) in Fuel Electrode Layer>

The molar ratio of NiO/(Ni+NiO) in the fuel electrode layer was measured by cross-sectional observation on the scanning electron microscope manufactured by JEOL Ltd.

<Measurement of Average Particle Diameter>

A liquid with dispersed powder was diluted with 2-propyl alcohol as disperse medium to obtain a powder-dispersed liquid having a powder density of 0.1 mass % for a measuring average particle diameter. An average particle diameter (Dv50) of the powder was obtained from a particle size distribution based on the volume of the powder-dispersed liquid for measuring average particle diameter. The particle size distribution based on the volume was measured with the dynamic light scattering method by using dynamic light scattering measuring apparatus (FPAR-1000, manufactured by Otsuka Electronics Co., Ltd.).

<Grain Size Measurement>

Images of 4 points at arbitrary suitable positions in the surface of the solid electrolyte layer were recorded on a scanning electron microscope (SEM; 4,000 magnifications). Every area of 200 grains (50 grains per 1 point) observed in the images was calculated, and an average area of 200 grains was calculated. Next, assuming that the each shape of grains was a circle, the grain size was obtained as the diameter of the circle calculated from the average area of 200 grains.

<Porosity Calculation Method>

Samples for observation in a cross-section of the solid electrolyte layer was prepared by polishing the cutting surface of the solid electrolyte layer with ion milling. Images (10,000 magnifications) of 5 points at arbitrary suitable positions in the polished cutting surface of the solid electrolyte layer were recorded on a field-emission-type scanning electron microscope (FE-SEM).

Binary images of pore area and non-pore area were created by imbinarizing from the images to calculate the area of pores and the area of non-pores respectively, and to obtain a porosity as an average rate of the area of pores in the whole area obtained from the images.

<Peeling Evaluation>

In a half cell after sintering the solid electrolyte layer, the presences of the peeling in each of interfaces between the adjacent two layers of the metal support, the metal oxide layer, the fuel electrode layer and the solid electrolyte layer were observed with eye observation. Further, on the half cell in which no peeling was observed with eye observation, peeling experiments by attaching and detaching a tape (mending tape 810, made by 3M Japan Limited) were conducted. On the half cell in which peeling was observed with the peeling experiments by attaching and detaching the tape, the states of the peeling portions were checked by observing on an electron microscope. These states of the peeling portions were evaluated by the following criteria.

[Criteria of Peeling Evaluation]

3: No peeling was observed with eye observation, and after tape detaching, no peeling in any interface was occurred.

2: No peeling was observed with eye observation, however, after tape detaching, peeling on a part in some interface was occurred.

1: No peeling was observed with eye observation, however, after tape detaching, plural peeling parts in some interface was observed.

0: Peeling was observed with eye observation.

Preparation Example 1

27.5 g of the powder of stabilized zirconia doped with 10 mol % of scandia and 1 mol % of ceria (0.196 mol of Zr atoms was contained), 2.5 g of bismuth oxide powder (made by Yasuda chemicals, average particle diameter: 2.4 µm) (0.0107 mol of Bi atoms were contained), 33.0 g of 2-propyl alcohol and 3.0 g of FLOWLEN G-700 (made by Kyoeisha Chemical Co., Ltd.) were measured and put into a 250 ml container made from polyethylene. Further, 150 g of zirconia beads of 0.5 mmΦ were added, and the mixed powder of 10Sc1CeSZ and bismuth oxide were ground with ball mill until the average particle diameter (Dv50) of the mixed powder became 170 nm or less. Then, the zirconia beads were filtered to obtain a mixed powder-liquid dispersion (1). An average particle diameter of the mixed powder in the resulting mixed powder-liquid dispersion was 160 nm.

Next, 3.5 parts by mass of ethyl cellulose and 40 parts by mass of alpha-terpineol were added to 100 parts by mass of the mixed powder-liquid dispersion (1) and the mixture was mixed to a homogeneous mixture. Then, the residual 2-propyl alcohol was removed by distilling to obtain a solid electrolyte paste (1). An average particle diameter of the mixed powder in the solid electrolyte paste (1) was 165 nm.

Preparation Example 2

A solid electrolyte paste (2) was produced in the same way as described in the preparation example 1 except for changing 2.5 g of bismuth oxide powder to 4.5 g of bismuth oxide powder (0.0193 mol of Bi atoms were contained). An average particle diameter of the mixed powder in the solid electrolyte paste (2) was 166 nm.

Comparative Preparation Example 1

30.0 g of the powder of stabilized zirconia doped with 10 mol % of scandia and 1 mol % of ceria (0.213 mol of Zr atoms was contained), 33.0 g of 2-propyl alcohol and 3.0 g of FLOWLEN G-700 (made by Kyoeisha Chemical Co., Ltd.) were measured and put into a 250 ml container made from polyethylene. Further, 150 g of zirconia beads of 0.5 mmΦ were added, and the powder was ground with ball mill until the average particle diameter (Dv50) of the powder became 170 nm or less. Then, the zirconia beads were filtered to obtain a powder-liquid dispersion. An average particle diameter of the mixed powder in the resulting powder-liquid dispersion was 154 nm.

Next, 3.5 parts by mass of ethyl cellulose and 40 parts by mass of alpha-terpineol were added to 100 parts by mass of the powder-liquid dispersion and the mixture was mixed to a homogeneous mixture. Then, the residual 2-propyl alcohol was removed by distilling to obtain a solid electrolyte paste. An average particle diameter of the mixed powder in the solid electrolyte paste was 160 nm.

Example 1

A ferritic stainless steel having: a diameter of 60 mmΦ; a support-thickness of 250 μm; and through holes of 140 pieces per 1 cm² in the center area having 40 mmΦ of diameter, was heated at 600° C. for 1 hour to prepare a metal support provided with a chromium oxide layer of 1 μm thickness on the metal support surface.

Next, 5 parts by mass of ethyl cellulose and 40 parts by mass of alpha-terpineol were added to 100 parts by mass of mixed powder consisting of 50 parts by mass of nickel oxide powder and 50 parts by mass of the powder of ceria doped with 10 mol % of gadolinia, and then the obtained mixture was kneaded to prepare a paste for fuel electrode. The obtained paste for fuel electrode was subjected to a coating treatment on the metal support by screen printing to cover the areas providing with the through holes, dried at 120° C. for 1 hour, and debindered at 450° C. for 2 hours. Then, a fuel electrode layer was formed on the metal support by sintering at 800° C. for 2 hours under a nitrogen atmosphere. In the fuel electrode layer, a thickness was 18 μm, a molar ratio of NiO/(Ni+NiO) was 45 mol %.

Further, the solid electrolyte paste (1) made in the preparation example 1 was subjected to a coating treatment on the fuel electrode layer formed on the metal support with screen print so that the fuel electrode layer was covered, and so that a peripheral part of the coating area of the solid electrolyte paste (1) was directly in contact with the under layer, i.e. the metal support to have about 5 mm in width of the area directly in contact with the metal support. Then, the resulting coating was dried at 150° C. for 30 minutes and sintered at 1000° C. for 2 hours under a nitrogen atmosphere to form a half cell laminated the fuel electrode layer and a solid electrolyte layer on the metal support. In the obtained solid electrolyte layer, a thickness was 10 μm, and peeling from the fuel electrode layer or the metal support was not observed in any surface of the solid electrolyte layer, so that the state of the peeling was evaluated as "3". A grain size observed in the surface of the solid electrolyte layer on the fuel electrode layer was 1.0 μm. Further, a porosity of the solid electrolyte layer was 1.8%, and a molar ratio of NiO/(Ni+NiO) in the fuel electrode layer was 46 mol % after sintering the solid electrolyte layer. In the peripheral part of the obtained solid electrolyte layer, the width of the area which was directly in contact with the under layer, i.e. the metal support was 4.5 mm at the narrowest portion.

Example 2

A fuel electrode layer was formed on a metal support in the same way as described in example 1. After that, a solid electrolyte layer was formed in the same way as described in example 1 except for changing the solid electrolyte paste (1) prepared in preparation example 1 to the solid electrolyte paste (2) prepared in preparation example 2, to form a half cell laminated the fuel electrode layer and the solid electrolyte layer in this order on the metal support. The thickness of the solid electrolyte layer was 18 μm. In the obtained half cell, peeling of the solid electrolyte layer from the fuel electrode layer or the metal support was not observed in the whole surface of the solid electrolyte layer, so that the state of the peeling was evaluated as "3". Further, a grain size observed in the surface of the solid electrolyte layer on the fuel electrode layer was 1.3 μm, and a porosity of the solid electrolyte layer was 2.5%. A molar ratio of NiO/(Ni+NiO) in the fuel electrode layer was 47 mol % after sintering the solid electrolyte layer. In the peripheral part of the obtained solid electrolyte layer, the width of the area which was directly in contact with the under layer, i.e. the metal support was 4.3 mm at the narrowest portion.

Example 3

A ferritic stainless steel having; a diameter of 60 mmΦ; a support-thickness of 250 μm; and 140 pieces per 1 cm² of through holes in the center area having 40 mmΦ of diameter, was plated to form a Ni—Co layer on the ferritic stainless steel surface, and heated at 800° C. for 1 hour to prepare a metal support provided with a Ni—Co spinel layer of 5 μm thickness on the metal support surface.

Next, 5 parts by mass of ethyl cellulose and 40 parts by mass of alpha-terpineol were added to 100 parts by mass of mixed powder consisting of 50 parts by mass of nickel oxide powder and 50 parts by mass of the powder of ceria doped with 10 mol % of gadolinia, and then the obtained mixture was kneaded to prepare a paste for fuel electrode. The obtained paste for fuel electrode was subjected to a coating treatment on the metal support by screen printing to cover the areas providing with the through holes, dried at 120° C. for 1 hour, and debindered at 450° C. for 2 hours. Then, a fuel electrode layer was formed on the metal support by sintering at 900° C. for 2 hours under a nitrogen atmosphere. In the fuel electrode layer, a thickness was 20 μm, a molar ratio of NiO/(Ni+NiO) was 59 mol %.

Further, the solid electrolyte paste (2) made in the preparation example 2 was subjected to a coating treatment on the fuel electrode layer formed on the metal support with screen print so that the fuel electrode layer was covered, and so that a peripheral part of the coating area of the solid electrolyte paste (2) was directly in contact with the under layer, i.e. the metal support to have about 2 mm in width of the area directly in contact with the metal support. Then, the resulting coating was dried at 150° C. for 30 minutes and sintered at 1000° C. for 2 hours under a nitrogen atmosphere to form a half cell laminated the fuel electrode layer and a solid electrolyte layer on the metal support. In the obtained solid electrolyte layer, a thickness was 13 μm, and peeling from the fuel electrode layer or the metal support was not observed in any surface of the solid electrolyte layer, so that the state of the peeling was evaluated as "3". A grain size observed in the surface of the solid electrolyte layer on the fuel electrode layer was 1.5 µm. Further, a porosity of the solid electrolyte layer was 1.5%, and a molar ratio of NiO/(Ni+NiO) in the fuel electrode layer was 61 mol % after sintering the solid electrolyte layer. In the peripheral part of the obtained solid electrolyte layer, the width of the area which was directly in contact with the under layer, i.e. the metal support was 2.1 mm at the narrowest portion.

Example 4

A half cell laminated a fuel electrode layer and a solid electrolyte layer on a metal support was formed in the same way as described in example 1 except for changing the metal support in example 1 to a metal support having a chromium oxide layer of 3 µm thickness on a surface of the metal support by heat-treating at 650° C. for 3 hours. The thickness of the fuel electrode layer was 19 µm, and the molar ratio of NiO/(Ni+NiO) in the fuel electrode layer was 47 mol %. The thickness of the solid electrolyte layer was 14 µm. Peeling of the solid electrolyte layer from the fuel electrode layer or the metal support was not observed in the whole surface of the solid electrolyte layer, so that the state of the peeling was evaluated as "3". Further, a grain size observed in the surface of the obtained solid electrolyte layer on the fuel electrode layer was 1.1 µm, and a porosity of the obtained solid electrolyte layer was 2.1%. A molar ratio of NiO/(Ni+NiO) in the fuel electrode layer was 48 mol % after sintering the solid electrolyte layer. In the peripheral part of the obtained solid electrolyte layer, the width of the area which was directly in contact with the under layer, i.e. the metal support was 4.8 mm at the narrowest portion.

Example 5

A half cell laminated a fuel electrode layer and a solid electrolyte layer on a metal support was formed in the same way as described in example 3 except for changing a sintering time of the fuel electrode layer from 2 hours to 3 hours. The thickness of the obtained fuel electrode layer was 20 µm, and the molar ratio of NiO/(Ni+NiO) in the fuel electrode layer was 71 mol %. The thickness of the solid electrolyte layer was 12 µm. Peeling of the solid electrolyte layer from the fuel electrode layer or the metal support was not observed in the whole surface of the solid electrolyte layer, so that the state of the peeling was evaluated as "3". Further, a grain size observed in the surface of the obtained solid electrolyte layer on the fuel electrode layer was 1.6 µm, and a porosity of the obtained solid electrolyte layer was 1.2%. A molar ratio of NiO/(Ni+NiO) in the fuel electrode layer was 72 mol % after sintering the solid electrolyte layer. In the peripheral part of the obtained solid electrolyte layer, the width of the area which was directly in contact with the under layer, i.e. the metal support was 2.0 mm at the narrowest portion.

Comparative Example 1

A half cell laminated a fuel electrode layer and a solid electrolyte layer on a metal support was formed in the same way as described in example 1 except for changing the solid electrolyte layer paste (1) prepared in preparation example 1 to the solid electrolyte layer paste prepared in comparative preparation example 1. The thickness of the obtained fuel electrode layer was 17 µm, and the thickness of the solid electrolyte layer was 11 µm. Peeling of the solid electrolyte layer from the fuel electrode layer or the metal support was not observed in the whole surface of the solid electrolyte layer with eye observation, however, the state of the peeling was evaluated as "1". Further, a grain size observed in the surface of the obtained solid electrolyte layer was 0.5 µm, and a porosity of the obtained solid electrolyte layer was 7.4%. A molar ratio of NiO/(Ni+NiO) in the fuel electrode layer was 46 mol % after sintering the solid electrolyte layer. In the peripheral part of the obtained solid electrolyte layer, the width of the area which was directly in contact with the under layer, i.e. the metal support was 4.6 mm at the narrowest portion.

Comparative Example 2

A half cell laminated a fuel electrode layer and a solid electrolyte layer on a metal support was formed in the same way as described in example 1 except for changing the metal support in example 1 to a metal support provided with a chromium oxide layer of 0.3 µm thickness on the surface of the metal support. The thickness of the obtained fuel electrode layer was 19 µm, and the thickness of the solid electrolyte layer was 11 µm. Peeling of the solid electrolyte layer from the metal support was observed in the area where the solid electrolyte layer was formed on the metal support directly, so that the state of the peeling was evaluated as "0". Further, a grain size observed in the surface of the obtained solid electrolyte layer formed on the fuel electrode layer was 1.0 µm, and a porosity of the obtained solid electrolyte layer was 1.8%. A molar ratio of NiO/(Ni+NiO) in the fuel electrode layer was 46 mol % after sintering the solid electrolyte layer. In the peripheral part of the obtained solid electrolyte layer, the width of the area which was directly in contact with the under layer, i.e. the metal support was 4.8 mm at the narrowest portion.

Comparative Example 3

A metal support was prepared in the same way as described in example 1.

Next, 5 parts by mass of ethyl cellulose and 40 parts by mass of alpha-terpineol were added to 100 parts by mass of mixed powder consisting of 50 parts by mass of nickel oxide powder and 50 parts by mass of the powder of ceria doped with 10 mol % of gadolinia, and the mixture was kneaded to prepare a paste for fuel electrode. The obtained paste for fuel electrode was subjected to a coating treatment on the metal support by screen printing to cover the areas providing with the through holes, dried at 120° C. for 1 hour, and debindered at 450° C. for 2 hours. Then, a fuel electrode layer was formed on the metal support by sintering at 800° C. for 1 hours under a hydrogen atmosphere. In the fuel electrode layer, a thickness was 18 µm, a molar ratio of NiO/(Ni+NiO) was 20 mol %.

Further, the solid electrolyte paste (1) made in the preparation example 1 was subjected to a coating treatment on the fuel electrode layer formed on the metal support with screen print so that the fuel electrode layer was covered, and so that a peripheral part of the coating area of the solid electrolyte paste (1) was directly in contact with the under layer, i.e. the metal support to have about 5 mm in width of the area directly in contact with the metal support. Then, the resulting coating was dried at 150° C. for 30 minutes and sintered at 1000° C. for 2 hours under a nitrogen atmosphere to form a half cell laminated the fuel electrode layer and a solid electrolyte layer on the metal support. In the obtained solid electrolyte layer, a thickness was 15 μm, and peeling from the fuel electrode layer or the metal support was not observed in any surface of the solid electrolyte layer with eye observation, however, the state of the peeling was evaluated as "1". A grain size observed in the surface of the solid electrolyte layer on the fuel electrode layer was 0.3 μm. Further, a porosity of the solid electrolyte layer was 9.8%, and a molar ratio of NiO/(Ni+NiO) in the fuel electrode layer was 34 mol % after sintering the solid electrolyte layer. In the peripheral part of the obtained solid electrolyte layer, the width of the area which was directly in contact with the under layer, i.e. the metal support was 4.7 mm at the narrowest portion.

INDUSTRIAL APPLICABILITY

The metal-supported cell of the present invention can be used for producing solid oxide fuel cells suitably.

REFERENCE SIGNS LIST

2: Metal-supported cell
4: Metal support
6: Fuel electrode layer
8: Solid electrolyte layer
10: Pore continuing from front surface to back surface
12: Metal oxide layer
14: Peripheral part of solid electrolyte layer
16: Contact portion being in solid electrolyte layer and being in contact with metal support

The invention claimed is:
1. A metal-supported cell having a laminate comprising:
a metal support being provided with a pore continuing from a front surface of said metal support to a back surface of said metal support; and
a fuel electrode layer and a solid electrolyte layer, being arranged in this order on said front surface of said metal support, wherein:
said solid electrolyte layer covers all parts of a surface of said fuel electrode layer, said parts being not in contact with said metal support, and a peripheral part of said solid electrolyte layer is in contact with said front surface of said metal support;
said metal support contains a metal oxide layer having a thickness of 1-5 μm on said front surface of said metal support;
said fuel electrode layer contains a conductive component and an ion-conductive component, said conductive component includes NiO and Ni, a molar ratio of NiO/(Ni+NiO) is 45% or more, and said ion-conductive component is gadolinium-doped ceria; and
said solid electrolyte layer mainly contains scandia-stabilized zirconia, contains Bi in an amount of 0.1-10.0 mol in terms of atom content relative to 100 mol of Zr atoms, and has a porosity of 5.0% or less as observed in a cross-section of said solid electrolyte layer on a scanning electron microscope, and a thickness of said solid electrolyte layer is 1-50 μm.
2. The metal-supported cell having a laminate according to claim 1, wherein the thickness of said solid electrolyte layer is 1-25 μm.
3. The metal-supported cell having a laminate according to claim 1, wherein the thickness of said solid electrolyte layer is 1-20 μm.
4. The metal-supported cell having a laminate according to claim 1, wherein the molar ratio of NiO/(Ni+NiO) is 45-80%.
5. The metal-supported cell having a laminate according to claim 1, wherein said solid electrolyte layer contains Bi in an amount of 2-10.0 mol in terms of atom content relative to 100 mol of Zr atoms.
6. The metal-supported cell having a laminate according to claim 1, wherein said solid electrolyte layer contains Bi in an amount of 4-10.0 mol in terms of atom content relative to 100 mol of Zr atoms.
7. The metal-supported cell having a laminate according to claim 1, wherein said solid electrolyte layer has a porosity of 5.0% or less.
8. The metal-supported cell having a laminate according to claim 1, wherein said solid electrolyte layer has a porosity of 2.0% or less.
9. The metal-supported cell having a laminate according to claim 1, wherein said solid electrolyte layer has an average grain size of 1.0-10 μm or more as observed on a FE-SEM.
10. The metal-supported cell having a laminate according to claim 1, wherein said solid electrolyte layer has an average grain size of 1.0-5 μm or more as observed on a FE-SEM.
11. The metal-supported cell having a laminate according to claim 1, wherein said solid electrolyte layer has an average grain size of 1.2-5.0 μm or more as observed on a FE-SEM.

* * * * *